Patented Aug. 10, 1948

2,446,793

UNITED STATES PATENT OFFICE 2,446,793

SUBSTITUTED PYRIDINIUM AND PIPERIDINIUM COMPOUNDS

Robert S. Shelton, Mariemont, and Marcus G. Van Campen, Jr., Wyoming, Ohio, assignors to The Wm. S. Merrell Company, Cincinnati, Ohio, a corporation of Delaware No Drawing. Application July 4, 1945, Serial No. 603,269

14 Claims. (Cl. 167—33)

1

This invention relates to compositions of matter for counteracting micro-organisms generally referred to as germs, including bacteria, fungi and the like, and compositions suitable for general use on inanimate objects as well as in the treatment of wounds, skin and mucous surfaces, etc. Although the compositions of our invention will most often be used as germicides, i. e. for killing of such micro-organisms, they may also be used to inhibit growth of such organisms (bacteriostatic action) or to render germs more or less innocuous by a partial or complete nullification of their harmful effects or by inhibition of their normal activities which produce the harmful effects. We refer to these various related uses generally as germ-counteracting.

According to the present invention an extraordinarily effective germ-counteracting composition may be provided with a heterocyclic quaternary ammonium compound, as the essential germ-counteracting ingredient thereof, in which the heterocyclic nucleus is a six-membered ring of five carbon atoms and the ammonium nitrogen atom, the ammonium nitrogen atom has directly attached thereto an aliphatic radical having three carbon atoms, and a carbon atom of the nucleus has attached thereto a substituent group having thirteen carbon atoms.

Prior to our present invention it has been known that quaternary ammonium compounds of the type having one higher molecular aliphatic constituent on the ammonium nitrogen exhibit germicidal and bacteriostatic effects. The prior patent of one of us, No. 2,295,504, disclosed that within this broad class of compounds extraordinary activity is exhibited by the compounds having a sixteen carbon atom group on the ammonium nitrogen. Surprisingly, as there shown, although adding or subtracting one or more carbon atoms in the high molecular weight substituent resulted in very significant changes in the activity of the compound, no such correlation was found between the activity and the size or nature of the low molecular weight substituents. Thus such different compounds as cetyl, trimethyl ammonium salts, cetyl tributyl ammonium salts, cetyl methyl piperidinium salts, and cetyl pyridinium salts were all strikingly superior to the lauryl or stearyl homologues corresponding to any of these.

However, as disclosed in our copending application Ser. No. 500,340, filed August 28, 1943, when a side chain is substituted on a carbon atom of the heterocyclic ammonium nucleus, the

2 length of the side chain affects the activity in the same manner as, and modifies the critical effect of, the higher molecular substituent on the nitrogen atom. Thus cetyl substituted pyridinium and piperidinium compounds still exhibit relatively high activity when unsubstituted and when methyl or ethyl is substituted on a carbon atom of the heterocyclic nucleus and such ethyl substituted compounds are the most active of the cetyl ammonium compounds; and the quaternary compounds with lower substituents on the nitrogen atom, which would be greatly inferior if otherwise unsubstituted, become equal to and in some cases even better than such ethyl compounds when appropriate side chains are attached on the C-atoms of their nuclei. We have shown in said application, No. 500,340, that the optimum is reached when the sum of the substituent side chains of more than two carbons in length is at least 16 and less than 19. Study and comparison of many such compounds has shown conclusively: First, that the peak of activity depends not upon a high molecular weight constituent alone, but upon the sum of the carbon atoms in the substituent on the ammonium nitrogen and in the side chains of at least two carbon atoms attached to carbon in the nucleus. Secondly, the peak activtiy occurs in the range from 16 to 18 carbon atoms, except that when the side chain on the carbon atom is of 8 or 9 carbon atoms in length the peak usually appears at 18 or 19 or in the range from 17–19. It has now been found that within this category of heterocyclic quaternary ammonium compounds having a carbon-attached substituent and a nitrogen-attached substituent with an aggregate of sixteen to eighteen carbon atoms, there is an extraordinarily active and valuable group of compounds characterized by the fact that the ring-substituted group contains thirteen carbon atoms and the nitrogen-substituted group contains three carbon atoms. This latter group of compounds possesses in common with some of the other compounds described in our co-pending application but to a greater degree a number of surprising advantages. In the first place the compounds of this group retain their activity better at room temperatures as well as body temperatures; whereas the quaternary ammonium germicides generally show a substantial reduction of germicidal activity at temperatures substantially below body temperature. Reference is also made to applicant's co-pending application Ser. No. 645,482 which contains related subject matter.

Moreover, the activity of the compounds as against Gram-negative organisms (represented for example by *E. Typhosa*) is more nearly abreast of the activity as against the Gram-positive organisms (represented by *Staph. aureus*), although with quaternary ammonium compounds in general activity against the former type of organism is substantially lower. The compounds of the present invention are usually at least as effective against the Gram-negative type as against the Gram-positive organisms and often are more active. Inasmuch as the organisms of the Gram-negative type are often considered to be of greater importance in the disinfection of inanimate objects, the relatively high activity as against these organisms and especially the maintained activity at lower temperatures are of great practical importance.

These compounds also exhibit extraordinarily high immunity to presence of serum and impurities which tend to inhibit the activity of most germicides.

Due to the extraordinarily high activity of these compounds against pathogenic organisms at relatively low temperatures and to their low toxicity to the human organism, higher plants and animals, these compounds have been found particularly valuable for sterilization of drinking water, leafy vegetables and other foods and beverages which are likely to carry infection and are to be drunk or eaten without further cooking.

Likewise, due to the properties mentioned above and to the hygroscopic nature of these compounds they are particularly advantageous for hospital and sick room sanitation. By washing room surfaces and particularly bed linens and bed clothing with a solution of these compounds, the surfaces are rendered antiseptic. By allowing a film of such solutions to remain on the surfaces air-borne germs which may accumulate thereon are rendered innocuous and the spread of infection by stirring up of such germs during cleaning, bed-making, etc., can be largely controlled. Since these compounds are also soluble in oil and are powerful emulsifying agents they may be applied for this purpose in oil emulsion, the oil serving more effectively to catch and hold dust particles.

These same properties make the compounds of the present invention very good for preservation of such substances as fruits, vegetables and other foods, clothing, shoes, wood and various other organic substances against attack by microorganisms including insects and their larvae.

In order to point out more fully the nature of the present invention and illustrate typical members of the group referred to above, the following specific examples are given:

N-(n-propyl)-4-n-tridecylpyridinium bromide

A quantity of 4-n-tridecylpyridine was prepared in accordance with the method proposed by Chichibabin which consists in alkylating 4-methyl pyridine with lauryl chloride and sodamide. Eight grams of the 4-n-tridecylpyridine as thus prepared was mixed with an approximately equimolar quantity of n-propyl bromide and heated at 70° C. for several days until the reaction was complete. The mixture was then dissolved in about two volumes of ether and cooled to approximately —20° C. at which temperature the quaternary compound crystallized from the solution. The crystals were filtered rapidly and dried in vacuo at a low temperature.

The crystalline product was hygroscopic, had a melting point of 62° C. to 63° C., and was soluble in water at 25° C., to the extent of one part in five by weight. When tested in 10% serum at the relatively low temperature of 20° C. this compound exhibited a C. K. D. against *Staph. aureus* of one part in 15,000 and a C. K. D. against *E. typhosa* of 1 part in 9000.

N-allyl 4-n-tridecylpyridinium chloride 13.1 grams of 4-n-tridecylpyridine prepared as in the first example, was mixed with an approximately equimolar quantity of allyl chloride. The reaction was permitted to proceed at room temperature for six days and the mixture was then heated at 70° C. for a day. As in the previous example, the mixture was then dissolved in two volumes of ether and cooled to —20° C. at which temperature the chloride crystallized. The resulting crystalline compound was hygroscopic, melted at 64° C. to 66° C., and was soluble in water. When tested with serum at 20° C. it exhibited a C. K. D. of one part in 14,250 with respect to *Staph. aureus* and one part in 9000 with *E. typhosa*.

N-(n-propyl)-N-methyl-4-n-tridecylpiperidinium bromide

A quantity of N-methyl-4-n-tridecylpiperidine was prepared by catalytic hydrogenation of N-methyl 4-n-tridecylpyridinium chloride. The hydrogenation was effected by using an Adam's platinum catalyst. A 10% to 15% solution of the quaternary ammonium chloride in ethyl alcohol, was hydrogenated at a pressure of 25 to 50 pounds per square inch for approximately one-half hour. The mixture was then basified, filtered to remove the catalyst and the amine was extracted with ether. After drying with sodium carbonate the ether was removed by evaporation. The product was distilled in vacuo and a fraction boiling between 143° C. and 145° C. at one millimeter absolute pressure was collected.

Eight grams of the N-methyl-4-n-tridecylpiperidine as thus prepared were mixed with 3.7 grams of n-propyl bromide and the mixture heated in a closed container for a week at 70° C. At the end of this period the product was removed and crystallized from acetone. The crystalline product had a melting point of 210° C. to 212° C. and was soluble in water to the extent of one part in five by weight. Its C. K. D. was comparable to that of the compounds described above.

N-allyl-N-methyl-4-n-tridecylpiperidinium chloride

Ten grams of N-methyl-4-n-tridecylpiperidine prepared as in the third example were mixed with an approximately equimolar quantity of allyl chloride and the mixture permitted to react for two days at room temperature after which it was heated at 70° C. for approximately thirty hours. At the end of this period the material was crystallized from acetone. The crystalline product melted at 170° C. to 172° C. and was very soluble in water forming a 20% solution readily. Its C. K. D. was comparable with that of the compounds previously described.

The C. K. D. figures given above have been obtained according to standardized accepted methods with standardized strains of organisms and are believed to be adequate for forming comparisons and conclusions but it should be remembered that these tests are made on live organisms and it has been observed that the actual C. K. D. figures were varied with variations in the nutrient media such as occur in successive batches obtained under the same specifications from carefully controlled sources and likewise variations of C. K. D. figures will occur with variations in the strain which cannot be eliminated since one is dealing with living organisms.

For ordinary germicidal and disinfecting purposes the compounds may be made up in water solutions of a strength, for example, 1:1,000 and diluted appropriately for the particular use to which they are to be put, or they may be furnished in crystalline form or more concentrated solution for appropriate dilution at the time of use. For treating hospital and sick room floors, walls, furniture and linen and patients' bed clothing, etc., an emulsion may be made with any desired strength, e. g., 1:500 of the quaternary ammonium compound, advantageously in accordance with the Patent No. 2,372,159.

For sterilization of drinking water, the compounds of our invention are advantageously made up in tablets of appropriate size for the container in which the water is to be used. In view of the small amount of active compound required for such sterilization, and in order to improve tableting and dissolution, it is ordinarily desirable to add a suitable diluent, for example, lactose. As one example, 45 parts of the N-n-propyl-4-n-tridecylpyridinium bromide according to our invention is mixed with 50 parts of lactose and 5 parts of sugar syrup and this mixture is then formed into tablets of suitable size for dissolving in a canteen, jug, water barrel, or other container in which the water is to be sterilized, to give an effective sterilizing strength of the active ingredients of say 1:10,000.

These compounds may also be used in place of other quaternary ammonium compounds in various known pharmaceutical compositions and germicidal and disinfectant preparations. In particular these compounds may be used in any of the formulae set forth below. They may be used in aqueous or oleaginous compositions as well as in organic solvents. They may be used in presence of acids or alkalies and with flavoring, coloring, therapeutic or many other types of ingredients. They may be used as indicated above for sterilization, or disinfection and they may be used for preservation of foods, clothing, wood, adhesives, biological materials, and in general wherever decomposition or putrefaction might occur.

Illustrative of such compositions are:

Mouth wash

| | Per cent |
|---|---|
| Germicide | .01–.02 |
| Boric acid | 1 |
| Alcohol | 20–30 |
| Flavor | as required |
| Color | as required |
| Water q. s. | 100 |

Skin antiseptic

| | Per cent |
|---|---|
| Germicide | .1–.5 |
| Dye | as required |
| Alcohol | 40–50 |
| Water q. s. | 100 |

Cough drops

| | Per cent |
|---|---|
| Germicide | .1 |
| Aromatics | as required |
| Sugar q. s. | 100 |

Lipstick

| | Per cent |
|---|---|
| Germicide | .1 |
| Beeswax | 33 |
| Lard | 12 |
| Castor oil | 41 |
| Lanolin | 4 |
| Water | 4 |
| Perfume and color q. s. | as required |

Dentifrice

| | Per cent |
|---|---|
| Germicide | 0.1 |
| $CaCO_3$ | 50 |
| Tricalcium phosphate | 25 |
| Magnesium carbonate (or hydroxide) | 24 |
| Sugar saccharin and flavor | 0.9 |
| Wetting agent | 0.1 |

Nose drops

| | Per cent |
|---|---|
| Germicide | 0.03 |
| Ephedrine $SO_4$ | 1 |
| Dextrose | 4 |
| Water q. s. | 100 |

Germicidal ointment

| | Per cent |
|---|---|
| Germicide | 0.2 |
| Petrolatum | 69 |
| Lanolin | 25 |
| Water | 6 |

Antiseptic medicated skin cream

| | Per cent |
|---|---|
| Germicide | 0.1 |
| Propylene glycol monostearate | 10.0 |
| Glycerin | 5.0 |
| Water | 85.0 |

Lubricating jelly

| | Per cent |
|---|---|
| Germicide | 0.1 |
| Tragacanth | 1.0 |
| Glycerin | 15.0 |
| Water | 100 |

These, of course, are only examples; and it should be understood that their proportions can be varied substantially and that numerous other types of compositions are within the scope of the invention.

We claim:

1. A germ counter-acting composition which comprises, as the essential germ counter-acting ingredient thereof, a heterocyclic quaternary ammonium compound in which the heterocyclic nucleus is a six-membered ring of five carbon atoms and the ammonium nitrogen atom, the ammonium atom having thereon an aliphatic radical of three carbon atoms, and an aliphatic radical having thirteen carbon atoms being attached to a carbon atom of said nucleus, said quaternary ammonium compound being present in said composition to the extent of between 0.1 and 0.5% by weight.

2. A germ counter-acting composition which comprises, as the essential germ counter-acting ingredient thereof a heterocyclic quaternary ammonium compound in which the heterocyclic nucleus is a six-membered ring of five carbon atoms and an ammonium nitrogen atom, the ammonium atom having thereon an aliphatic group of three carbon atoms, and an n-tridecyl radical being attached to a carbon atom of said nucleus.

3. A germ counter-acting composition which comprises, as the essential germ counter-acting ingredient thereof a heterocyclic quaternary ammonium compound in which the heterocyclic nucleus is a six-membered ring of five carbon atoms and an ammonium nitrogen atom, the ammonium atom having thereon an aliphatic radical of three carbon atoms and an n-tridecyl radical is attached to said nucleus in the "4" position.

4. A germ counter-acting composition which comprises, as the essential germ counter-acting ingredient thereof, a heterocyclic quaternary ammonium compound in which the heterocyclic nucleus is a six-membered ring of five carbon atoms plus an ammonium nitrogen atom, a propyl radical is attached to said nitrogen atom, and an aliphatic radical having thirteen carbon atoms is attached to a carbon atom of said nucleus.

5. A germ counter-acting composition which comprises, as the essential germ counter-acting ingredient thereof, a heterocyclic quaternary ammonium compound in which the heterocyclic nucleus is a six-membered ring of five carbon atoms and an ammonium nitrogen atom, an allyl radical is attached to said nitrogen atom, and an aliphatic radical having thirteen carbon atoms is attached to a carbon atom of said nucleus.

6. A germ counter-acting composition which comprises, as the essential germ counter-acting ingredient thereof, a pyridinium compound in which an aliphatic radical having three carbon atoms is attached to the nitrogen atom of the pyridinium nucleus and an aliphatic radical having thirteen carbon atoms is attached to a carbon atom of said nucleus.

7. A germ counter-acting composition which comprises, as the essential germ counter-acting ingredient thereof, a piperidinium compound in which an aliphatic radical having three carbon atoms is attached to the nitrogen atom of the piperidinium nucleus and an aliphatic radical having thirteen carbon atoms is attached to a carbon atom of said nucleus.

8. A germ counter-acting composition which comprises, an aqueous solution of an N-n-propyl 4-n-tridecyl pyridinium compound said compound being present in said composition to the extent of between 0.1 and 0.5% by weight.

9. A germ counter-acting composition which comprises an aqueous solution of an N-allyl 4-n-tridecyl pyridinium compound said compound being present in said composition to the extent of between 0.1 and 0.5% by weight.

10. A germ counter-acting composition which comprises an aqueous solution of an N-n-propyl 4-n-tridecyl piperidinium compound said compound being present in said composition to the extent of between 0.1 and 0.5% by weight.

11. As a new composition of matter, a heterocyclic quaternary ammonium compound in which the heterocyclic nucleus is a six-membered ring of five carbon atoms and the ammonium nitrogen atom, the ammonium atom having thereon an aliphatic group having three carbon atoms, and an aliphatic group having thirteen carbon atoms is attached to a carbon atom of said nucleus.

12. As a new composition of matter, an N-n-propyl-4-n-tridecylpyridinium compound.

13. As a new composition of matter, an N-allyl-4-n-tridecylpyridinium compound.

14. As a new composition of matter, an N-n-propyl-4-n-tridecylpiperidinium compound.

ROBERT S. SHELTON.
MARCUS G. VAN CAMPEN, Jr.